(12) United States Patent
Yoo et al.

(10) Patent No.: US 11,565,202 B2
(45) Date of Patent: *Jan. 31, 2023

(54) LIQUID DISPENSER FOR ANIMALS

(71) Applicant: LG ELECTRONICS INC., Seoul (KR)

(72) Inventors: Hyunsun Yoo, Seoul (KR); Jaehung Chun, Seoul (KR); Yousook Eun, Seoul (KR); Joogyeom Kim, Seoul (KR); Sungkyung Kim, Seoul (KR); Myongsun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 361 days.

This patent is subject to a terminal disclaimer.

(21) Appl. No.: 16/571,073

(22) Filed: Sep. 14, 2019

(65) Prior Publication Data

US 2020/0086244 A1 Mar. 19, 2020

Related U.S. Application Data

(60) Provisional application No. 62/733,393, filed on Sep. 19, 2018.

(30) Foreign Application Priority Data

Oct. 30, 2018 (KR) .................. 10-2018-0131038
May 22, 2019 (KR) .................. 10-2019-0059787

(51) Int. Cl.
*B01D 35/02* (2006.01)
*A01K 7/02* (2006.01)
(Continued)

(52) U.S. Cl.
CPC .............. *B01D 35/02* (2013.01); *A01K 7/005* (2013.01); *A01K 7/025* (2013.01); *F25B 21/02* (2013.01)

(58) Field of Classification Search
CPC ................................ A01K 7/005; A01K 7/022
See application file for complete search history.

(56) References Cited

U.S. PATENT DOCUMENTS 1,512,629 A 10/1924 Mueller et al.
2,103,653 A 12/1937 Weil
(Continued)

FOREIGN PATENT DOCUMENTS

CA 2082083 5/1994
CA 2587229 5/2006
(Continued)

OTHER PUBLICATIONS

Chinese Office Action dated Apr. 1, 2021 issued in CN Application No. 201910886305.X.

(Continued)

*Primary Examiner* — Timothy D Collins
*Assistant Examiner* — Brittany A Lowery
(74) *Attorney, Agent, or Firm* — KED & Associates, LLP

(57) ABSTRACT

A pet water dispenser may include a water tank to store water and an inner assembly detachably coupled to the water tank and provided inside the water tank. The inner assembly may include a pump. A bottom plate of the water tank may be formed with a protrusion projecting upward, while the inner assembly may include a support cylinder having a cavity or recess that is inserted onto the protrusion. The support cylinder may include an upper surface and a sidewall to define the cavity or recess. The inner assembly may further include a filter coupled to the support cylinder.

20 Claims, 7 Drawing Sheets

(51) Int. Cl.
  *A01K 7/00* (2006.01)
  *F25B 21/02* (2006.01)

(56) References Cited

U.S. PATENT DOCUMENTS

| | | |
|---|---|---|
| 2,510,446 A | 6/1950 | Weil |
| 3,076,435 A | 2/1963 | Seymour |
| 3,303,824 A | 2/1967 | Anderson |
| 3,441,003 A | 4/1969 | Du Mond et al. |
| D221,755 S | 9/1971 | Johnson |
| 3,691,787 A | 9/1972 | Kaufmann |
| 3,765,614 A | 10/1973 | Bartl et al. |
| 4,100,885 A | 7/1978 | Kapplinger |
| 4,133,456 A | 1/1979 | Corini |
| 4,286,546 A | 9/1981 | Moore |
| 4,561,384 A | 12/1985 | Liff |
| 4,640,226 A | 2/1987 | Liff |
| 4,932,561 A | 6/1990 | Boxall |
| 5,031,689 A | 7/1991 | Jones et al. |
| 5,105,771 A | 4/1992 | Schafer |
| 5,140,134 A | 8/1992 | Reusche et al. |
| 5,174,245 A | 12/1992 | Bishop |
| 5,205,242 A | 4/1993 | Kasselman |
| 5,209,069 A | 5/1993 | Newnan |
| 5,345,063 A | 9/1994 | Reusche et al. |
| 5,601,199 A | 2/1997 | Marty |
| 5,699,669 A | 12/1997 | Gebhard |
| 5,791,287 A | 8/1998 | Gruber |
| 5,799,609 A | 9/1998 | Burns et al. |
| 5,845,605 A | 12/1998 | Malamphy |
| 5,884,582 A | 3/1999 | Duckworth |
| 6,230,653 B1 | 5/2001 | Tobin |
| 6,460,483 B1 | 10/2002 | Northrop et al. |
| 6,622,657 B2 | 9/2003 | Northrop et al. |
| 6,705,540 B2 | 3/2004 | Koshiyama et al. |
| 6,848,392 B1 | 2/2005 | Kreutzer, Jr. |
| 7,089,881 B2 | 8/2006 | Plante |
| 7,270,082 B2 | 9/2007 | Plante |
| 7,549,395 B2 | 6/2009 | Stenberg |
| 7,600,486 B2 | 10/2009 | Ellis |
| 7,743,698 B2 | 6/2010 | Muir et al. |
| 7,823,538 B1 | 11/2010 | Merager |
| 8,117,991 B1 | 2/2012 | Civitillo |
| 8,210,447 B2 | 7/2012 | Cohen |
| 8,387,566 B2 | 3/2013 | Graves et al. |
| 8,770,147 B2 | 7/2014 | Rowe |
| 8,770,148 B2 | 7/2014 | Lipscomb et al. |
| 9,035,222 B2 | 5/2015 | Alexander |
| D738,579 S | 9/2015 | Owens et al. |
| D755,449 S | 5/2016 | Cornwell, Jr. et al. |
| 9,497,930 B2 | 11/2016 | Lipscomb et al. |
| 1,243,126 A1 | 10/2017 | Ziener |
| D819,898 S | 6/2018 | Poisson et al. |
| 10,165,753 B1 | 1/2019 | Huang |
| 11,154,034 B2 | 10/2021 | Youn et al. |
| 11,160,250 B2 | 11/2021 | Yoo et al. |
| 2002/0020673 A1 | 2/2002 | Nohren et al. |
| 2003/0115902 A1 | 6/2003 | Busick et al. |
| 2003/0140864 A1 | 7/2003 | Wenstrand |
| 2003/0213437 A1 | 11/2003 | Norris |
| 2005/0166853 A1 | 8/2005 | Plante |
| 2006/0174838 A1 | 8/2006 | Plante |
| 2006/0231040 A1 | 10/2006 | Bast et al. |
| 2006/0288947 A1 | 12/2006 | Perlsweig et al. |
| 2007/0045159 A1 | 3/2007 | Lee |
| 2007/0095297 A1 | 5/2007 | Boyd |
| 2007/0199512 A1 | 8/2007 | Ellis |
| 2007/0227456 A1 | 10/2007 | Borey |
| 2008/0078330 A1 | 4/2008 | McCallum et al. |
| 2008/0169249 A1 | 7/2008 | Ter Stege |
| 2008/0190374 A1 | 8/2008 | Farris |
| 2008/0257272 A1 | 10/2008 | Bolda |
| 2009/0126641 A1 | 5/2009 | Anderson et al. |
| 2009/0218985 A1 | 9/2009 | Hallett |
| 2010/0095897 A1 | 4/2010 | Rowe |
| 2010/0276508 A1 | 11/2010 | Davies |
| 2010/0300366 A1 | 12/2010 | Lipscomb et al. |
| 2011/0067638 A1 | 3/2011 | Lipscomb et al. |
| 2011/0102945 A1 | 5/2011 | Isono et al. |
| 2011/0214613 A1 | 9/2011 | Diamond |
| 2011/0226470 A1 | 9/2011 | Latrille et al. |
| 2011/0259273 A1 | 10/2011 | Lipscomb et al. |
| 2012/0017839 A1 | 1/2012 | Veness et al. |
| 2012/0111280 A1 | 5/2012 | Shin et al. |
| 2012/0216751 A1 | 8/2012 | Rowe |
| 2013/0087102 A1 | 4/2013 | Lipscomb et al. |
| 2013/0092090 A1 | 4/2013 | McCallum |
| 2013/0175802 A1 | 7/2013 | Breau et al. |
| 2013/0192529 A1 | 8/2013 | Kruger et al. |
| 2013/0200064 A1 | 8/2013 | Alexander |
| 2013/0228132 A1 | 9/2013 | Lipscomb et al. |
| 2013/0255280 A1 | 10/2013 | Murphy et al. |
| 2014/0033984 A1 | 2/2014 | Li et al. |
| 2014/0053781 A1 | 2/2014 | Lewis |
| 2014/0076242 A1 | 3/2014 | Ho |
| 2014/0165607 A1 | 6/2014 | Alexander |
| 2014/0251223 A1 | 9/2014 | Rowe et al. |
| 2014/0353335 A1 | 12/2014 | Van Diepen |
| 2015/0135728 A1 | 5/2015 | Swanson et al. |
| 2015/0189862 A1* | 7/2015 | Lipscomb .............. B01D 29/01 210/232 |
| 2015/0196157 A1 | 7/2015 | Swisth |
| 2015/0276204 A1 | 10/2015 | Ray |
| 2015/0313180 A1 | 11/2015 | Lipscomb et al. |
| 2015/0353335 A1 | 12/2015 | Breault |
| 2016/0000037 A1 | 1/2016 | Lipscomb et al. |
| 2016/0099599 A1 | 4/2016 | Ho et al. |
| 2016/0113249 A1 | 4/2016 | Kuo |
| 2016/0118179 A1 | 4/2016 | Park et al. |
| 2016/0159633 A1 | 6/2016 | Diffenderfer |
| 2016/0286757 A1 | 10/2016 | Armstrong |
| 2016/0287363 A1 | 10/2016 | Miller |
| 2017/0245465 A1 | 8/2017 | Oates et al. |
| 2017/0255186 A1 | 9/2017 | Ryznar et al. |
| 2018/0054073 A1 | 2/2018 | Olson et al. |
| 2018/0160648 A1 | 6/2018 | Goh |
| 2018/0177325 A1 | 6/2018 | Lyons et al. |
| 2019/0075755 A1 | 3/2019 | Imaizumi et al. |
| 2019/0140471 A1 | 5/2019 | Johanski et al. |
| 2019/0162460 A1 | 5/2019 | Oh |
| 2019/0227580 A1 | 7/2019 | von der Assen et al. |
| 2019/0239476 A1 | 8/2019 | Mai et al. |
| 2019/0239491 A1 | 8/2019 | Yu et al. |
| 2019/0357747 A1 | 11/2019 | Keiler, III |
| 2020/0303971 A1 | 9/2020 | Hall et al. |
| 2020/0337266 A1 | 10/2020 | Yu et al. |
| 2020/0355751 A1 | 11/2020 | Swaans et al. |

FOREIGN PATENT DOCUMENTS

| | | |
|---|---|---|
| CH | 711714 | 1/2022 |
| CN | 2322412 | 6/1999 |
| CN | 2351955 | 12/1999 |
| CN | 1701206 | 11/2005 |
| CN | 2776044 | 5/2006 |
| CN | 1870903 | 11/2006 |
| CN | 200994393 | 12/2007 |
| CN | 200994394 | 12/2007 |
| CN | 201365463 | 12/2009 |
| CN | 201422313 | 3/2010 |
| CN | 201530253 | 7/2010 |
| CN | 101790970 | 8/2010 |
| CN | 201541568 | 8/2010 |
| CN | 101816289 | 9/2010 |
| CN | 101841191 | 9/2010 |
| CN | 102072468 | 5/2011 |
| CN | 102480927 | 5/2012 |
| CN | 102600661 | 7/2012 |
| CN | 202310894 | 7/2012 |
| CN | 102934044 | 2/2013 |
| CN | 202722224 | 2/2013 |
| CN | 202873523 | 4/2013 |
| CN | 203136752 | 8/2013 |
| CN | 203544552 | 4/2014 |

(56) References Cited

FOREIGN PATENT DOCUMENTS

| | | |
|---|---|---|
| CN | 203618522 | 6/2014 |
| CN | 103917147 | 7/2014 |
| CN | 103931515 | 7/2014 |
| CN | 203913286 | 11/2014 |
| CN | 204707695 | 10/2015 |
| CN | 204722018 | 10/2015 |
| CN | 105265331 | 1/2016 |
| CN | 205005702 | 2/2016 |
| CN | 105792644 | 7/2016 |
| CN | 205431490 | 8/2016 |
| CN | 105923696 | 9/2016 |
| CN | 205682161 | 11/2016 |
| CN | 106172064 | 12/2016 |
| CN | 106212310 | 12/2016 |
| CN | 205830734 | 12/2016 |
| CN | 106332801 | 1/2017 |
| CN | 205884322 | 1/2017 |
| CN | 106787233 | 5/2017 |
| CN | 206142936 | 5/2017 |
| CN | 206227319 | 6/2017 |
| CN | 106962218 | 7/2017 |
| CN | 206314381 | 7/2017 |
| CN | 107041318 | 8/2017 |
| CN | 107124043 | 9/2017 |
| CN | 107259458 | 10/2017 |
| CN | 107509653 | 12/2017 |
| CN | 206699096 | 12/2017 |
| CN | 206760412 | 12/2017 |
| CN | 206760441 | 12/2017 |
| CN | 107568092 | 1/2018 |
| CN | 206851699 | 1/2018 |
| CN | 107660756 | 2/2018 |
| CN | 206949206 | 2/2018 |
| CN | 107821202 | 3/2018 |
| CN | 107897027 | 4/2018 |
| CN | 207268238 | 4/2018 |
| CN | 107969351 | 5/2018 |
| CN | 207411173 | 5/2018 |
| CN | 207443927 | 6/2018 |
| CN | 207519400 | 6/2018 |
| CN | 108271728 | 7/2018 |
| CN | 108353810 | 8/2018 |
| CN | 108377928 | 8/2018 |
| CN | 108464253 | 8/2018 |
| CN | 207740217 | 8/2018 |
| CN | 207803161 | 9/2018 |
| CN | 207870035 | 9/2018 |
| CN | 207870035 U * | 9/2018 ............ A01K 7/02 |
| CN | 109997713 | 7/2019 |
| DE | 20 2016 107 252 | 3/2018 |
| EP | 0 894 430 | 2/1999 |
| EP | 1 188 995 | 3/2002 |
| EP | 1 566 099 | 8/2005 |
| EP | 3 315 022 | 5/2018 |
| EP | 3 520 607 | 8/2019 |
| FR | 2 726 452 | 5/1996 |
| GB | 2 458 173 | 9/2009 |
| GB | 2574921 | 12/2019 |
| JP | H05-118725 | 5/1993 |
| JP | H07-269800 | 10/1995 |
| JP | 2012-188163 | 10/2012 |
| JP | 3200546 | 10/2015 |
| JP | 2017-148018 | 8/2017 |
| JP | 2018-057340 | 4/2018 |
| KR | 10-0835557 | 6/2008 |
| KR | 10-2010-0046615 | 5/2010 |
| KR | 10-1116332 | 3/2012 |
| KR | 10-2013-0136123 | 12/2013 |
| KR | 10-2014-0042949 | 4/2014 |
| KR | 20-0475039 | 11/2014 |
| KR | 10-2017-0003154 | 1/2017 |
| KR | 10-2017-0017718 | 2/2017 |
| KR | 10-1825334 | 2/2018 |
| KR | 10-1898661 | 9/2018 |
| RU | 2650560 | 4/2018 |
| TW | 201641007 | 12/2016 |
| TW | I 574614 | 3/2017 |
| WO | WO 2009/016604 | 2/2009 |
| WO | WO 2010/138799 | 12/2010 |
| WO | WO 2011/035320 | 3/2011 |
| WO | WO 2013/012943 | 1/2013 |
| WO | WO 2014/209159 | 12/2014 |
| WO | WO 2017/185053 | 10/2017 |

OTHER PUBLICATIONS

Chinese Office Action dated Apr. 9, 2021 issued in CN Application No. 201910886526.7.
European Search Report dated Apr. 23, 2020 issued in EP Application No. 19198303.0.
Chinese Office Action dated Mar. 30, 2021 issued in CN Application No. 201910886714.X.
Chinese Office Action dated May 21, 2021 issued in CN Application No. 201910888661.5.
European Search Report dated Feb. 24, 2020 issued in EP Application No. 19198289.1.
Chinese Office Action dated Mar. 31, 2021 issued in CN Application No. 201910886533.7.
European Search Report dated Feb. 14, 2020 issued in Application No. 19198187.7.
European Search Report dated Feb. 14, 2020 issued in Application No. 19198196.8.
European Search Report dated Feb. 19, 2020 issued in Application No. 19198191.9.
European Search Report dated Feb. 19, 2020 issued in Application No. 19198200.8.
United States Office Action dated Mar. 30, 2021 issued in co-pending related U.S. Appl. No. 16/571,090.
United States Office Action dated May 11, 2021 issued in co-pending related U.S. Appl. No. 16/571,093.
Chinese Office Action dated May 17, 2021 issued in CN Application No. 201910887029.9.
Chinese Office Action dated May 17, 2021 issued in CN Application No. 201910889360.4.
Chinese Office Action dated May 18, 2021 issued in CN Application No. 201910888671.9.
European Search Report dated Feb. 3, 2020 issued in EP Application No. 19198170.3.
European Search Report dated Feb. 27, 2020 issued in Application No. 19198292.5.
European Search Report dated Feb. 27, 2020 issued in Application No. 19198298.2.
Chinese Office Action dated May 10, 2021 issued in CN Application No. 201910888718.1.
Chinese Office Action dated May 17, 2021 issued in CN Application No. 201910889361.9.
Chinese Office Action issued in Application No. 201910888224.3 dated Apr. 12, 2021.
Chinese Office Action issued in Application No. 201910888611.7 dated Apr. 12, 2021.
Chinese Office Action issued in Application No. 201910888695.4 dated Apr. 16, 2021.
Chinese Office Action issued in Application No. 201910887007.2 dated Apr. 20, 2021.
Chinese Office Action issued in Application No. 201910886974.7 dated Apr. 20, 2021.
Chinese Office Action issued in Application No. 201910886711.6 dated Apr. 20, 2021.
Chinese Office Action issued in Application No. 201910889081.8 dated Apr. 20, 2021.
Chinese Office Action issued in Application No. 201910888688.4 dated Apr. 21, 2021.
Chinese Office Action issued in Application No. 201910886539.4 dated Apr. 22, 2021.
Chinese Office Action issued in Application No. 201910889318.2 dated Apr. 22, 2021.
Chinese Office Action issued in Application No. 201910888721.3 dated Apr. 22, 2021.

(56) References Cited

OTHER PUBLICATIONS

Chinese Office Action issued in Application No. 201910888102.4 dated Apr. 26, 2021.
European Search Report dated Apr. 17, 2020 issued in EP Application No. 19198180.2.
European Search Report dated Apr. 17, 2020 issued in EP Application No. 19198307.1.
European Search Report dated Apr. 20, 2020 issued in EP Application No. 19198310.5.
European Search Report dated Apr. 20, 2020 issued in EP Application No. 19198368.3.
European Search Report dated Feb. 3, 2020 issued in Application No. 19198173.7.
European Search Report dated Feb. 3, 2020 issued in Application No. 19198182.8.
European Search Report dated Feb. 3, 2020 issued in Application No. 19198183.6.
European Search Report dated Feb. 3, 2020 issued in Application No. 19198184.4.
European Search Report dated Feb. 3, 2020 issued in Application No. 19198186.9.
European Search Report dated Feb. 3, 2020 issued in Application No. 19198202.4.
European Search Report dated Feb. 10, 2020 issued in Application No. 19198265.1.
European Search Report dated Apr. 9, 2020 issued in EP Application No. 19198174.5.
United States Office Action dated Jun. 2, 2020 issued in co-pending related U.S. Appl. No. 16/574,259.
United States Office Action dated Apr. 27, 2021 issued in co-pending related U.S. Appl. No. 16/569,841.
United States Office Action dated Apr. 27, 2021 issued in co-pending related U.S. Appl. No. 16/574,418.
Dong, CN108464253A Machine Translation Description, Aug. 31, 2018, obtained Jan. 13, 2022 (Year: 2018).
United States Office Action dated Mar. 14, 2022 issued in co-pending related U.S. Appl. No. 16/570,310.
United States Office Action dated Mar. 17, 2022 issued in co-pending related U.S. Appl. No. 16/574,581.
United States Office Action dated Feb. 1, 2022 issued in co-pending related U.S. Appl. No. 16/574,237.
United States Office Action dated Feb. 11, 2022 issued in co-pending related U.S. Appl. No. 16/574,322.
United States Office Action dated Oct. 5, 2021 issued in co-pending related U.S. Appl. No. 16/571,074.
Chinese Office Action dated Nov. 10, 2021 issued in CN Application No. 201910886533.7.
Chinese Office Action dated Nov. 10, 2021 issued in CN Application No. 201910886714.X.
United States Office Action dated Dec. 6, 2021 issued in co-pending related U.S. Appl. No. 16/569,827.
United States Office Action dated Dec. 10, 2021 issued in co-pending related U.S. Appl. No. 16/571,075.
Chinese Notice of Allowance dated Apr. 8, 2022 issued in CN Application No. 201910888611.7.
United States Office Action dated Jun. 23, 2022 issued in co-pending related U.S. Appl. No. 16/574,368.
United States Office Action dated Jul. 5, 2022 issued in co-pending related U.S. Appl. No. 16/574,240.
United States Office Action dated Jul. 7, 2022 issued in co-pending related U.S. Appl. No. 16/574,474.
United States Office Action dated Jul. 29, 2022 issued in co-pending related U.S. Appl. No. 16/574,322.
Chinese Notice of Allowance dated Jul. 11, 2022 issued in CN Application No. 201910886305.X.
United States Office Action dated May 19, 2022 issued in co-pending related U.S. Appl. No. 16/569,827.
United States Office Action dated Jun. 1, 2022 issued in co-pending related U.S. Appl. No. 16/571,075.
United States Office Action dated Jun. 2, 2022 issued in co-pending related U.S. Appl. No. 16/570,279.
United States Office Action dated Jun. 15, 2022 issued in co-pending related U.S. Appl. No. 16/569,908.
United States Office Action dated Aug. 29, 2022 issued in co-pending related U.S. Appl. No. 16/571,245.
U.S. Appl. No. 16/574,219, filed Sep. 18, 2019.
U.S. Appl. No. 16/574,240, filed Sep. 18, 2019.
U.S. Appl. No. 16/574,237, filed Sep. 18, 2019.
U.S. Appl. No. 16/574,312, filed Sep. 18, 2019.
U.S. Appl. No. 16/574,349, filed Sep. 18, 2019.
U.S. Appl. No. 16/574,322, filed Sep. 18, 2019.
U.S. Appl. No. 16/574,368, filed Sep. 18, 2019.
U.S. Appl. No. 16/574,474, filed Sep. 18, 2019.
U.S. Appl. No. 16/574,581, filed Sep. 18, 2019.
U.S. Appl. No. 16/571,245, filed Sep. 16, 2019.
U.S. Appl. No. 16/571,093, filed Sep. 14, 2019.
U.S. Appl. No. 16/571,089, filed Sep. 14, 2019.
U.S. Appl. No. 16/571,076, filed Sep. 14, 2019.
U.S. Appl. No. 16/571,074, filed Sep. 14, 2019.
U.S. Appl. No. 16/571,075, filed Sep. 14, 2019.
U.S. Appl. No. 16/571,073, filed Sep. 14, 2019.
U.S. Appl. No. 16/570,310, filed Sep. 13, 2019.
U.S. Appl. No. 16/570,279, filed Sep. 13, 2019.
U.S. Appl. No. 16/569,827, filed Sep. 13, 2019.
U.S. Appl. No. 16/569,908, filed Sep. 13, 2019.
U.S. Appl. No. 16/574,259, filed Sep. 18, 2019.
U.S. Appl. No. 16/574,418, filed Sep. 18, 2019.
U.S. Appl. No. 16/571,090, filed Sep. 14, 2019.
U.S. Appl. No. 16/569,841, filed Sep. 13, 2019.
United States Office Action dated Mar. 24, 2022 issued in co-pending related U.S. Appl. No. 16/571,089.
United States Office Action dated Sep. 19, 2022 issued in co-pending related U.S. Appl. No. 16/569,827.
United States Office Action dated Oct. 11, 2022 issued in co-pending related U.S. Appl. No. 16/570,279.
United States Office Action dated Oct. 13, 2022 issued in co-pending related U.S. Appl. No. 16/571,089.
Chinese Notice of Allowance dated Aug. 31, 2022 issued in CN Application No. 201910889318.2.
Chinese Office Action dated Sep. 21, 2022 issued in CN Application No. 201910888224.3.

\* cited by examiner

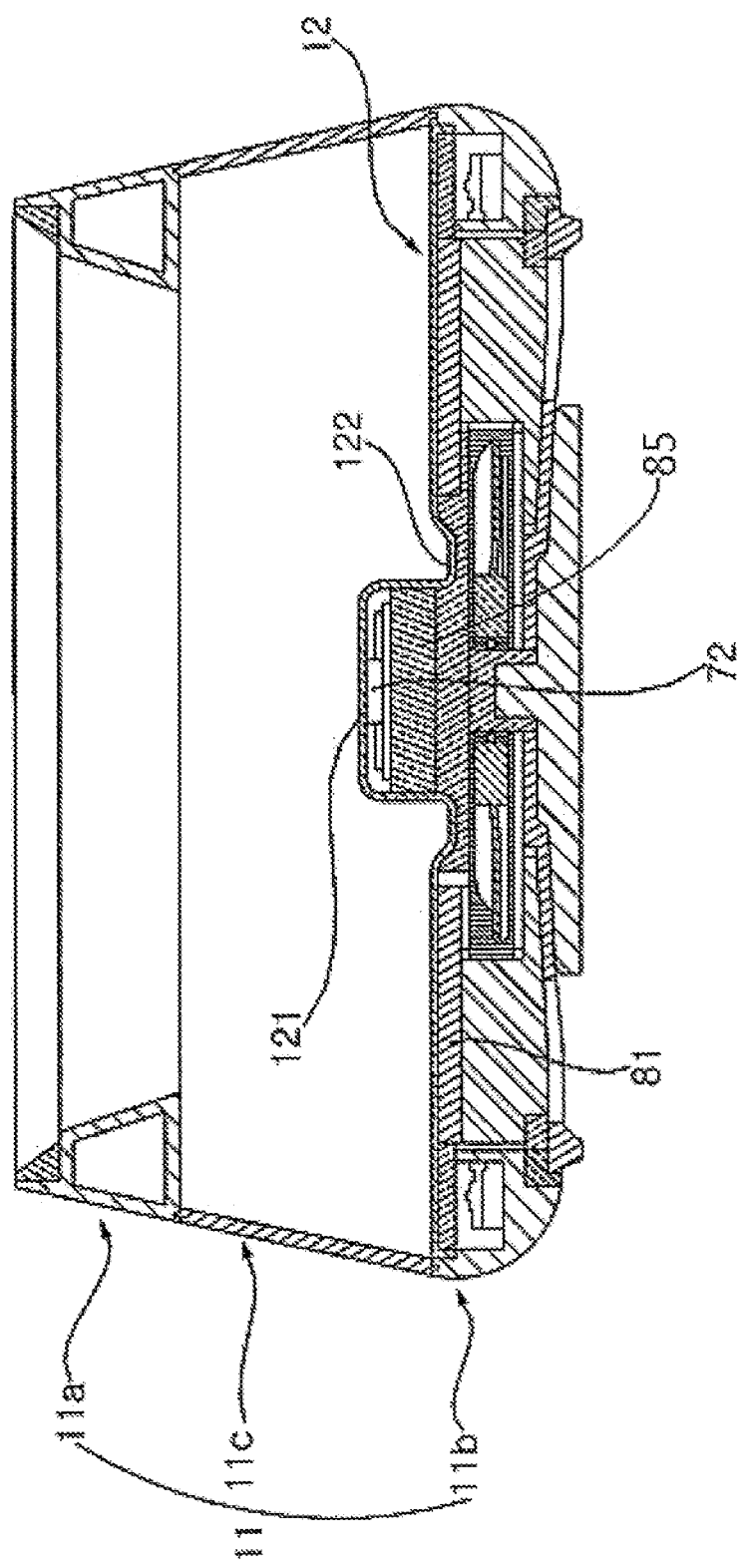

LIQUID DISPENSER FOR ANIMALS

CROSS-REFERENCE TO RELATED APPLICATION(S)

This application claims priority under 35 U.S.C. § 119 to U.S. Provisional Application No. 62/733,393 filed on Sep. 19, 2018, and Korean Application No. 10-2019-0059787 filed on May 22, 2019, and 10-2018-0131038 filed on Oct. 30, 2018, whose entire disclosure(s) is/are hereby incorporated by reference.

BACKGROUND

1. Field

A liquid dispenser to supply liquid to an animal, e.g., a pet, is disclosed herein.

2. Background

In recent years, the population of people raising pets have increased, in addition to attachment and interest in pets. Like most animals, pets need to drink water to survive and maintain a biorhythm. Since pets are often left alone and since communication with their owners is difficult, the demand for pet water dispensers or water supply devices has increased.

European Patent No. 3315022 A1 and U.S. Publication No. 2014/0053781 disclose drinking bowls for pets. However, such drinking bowls have various disadvantages, which the present disclosure solves.

The above references are incorporated by reference herein where appropriate for appropriate teachings of additional or alternative details, features and/or technical background.

BRIEF DESCRIPTION OF THE DRAWINGS

FIG. 4A is a cross-sectional view of the water tank;

DETAILED DESCRIPTION

A pet water dispenser may be basically provided with an inner assembly 100 containing a pump 20 and detachably coupled to a water tank or storage chamber 10. The inner assembly may supply water from the water tank 10 to an outside.

Figure 1:
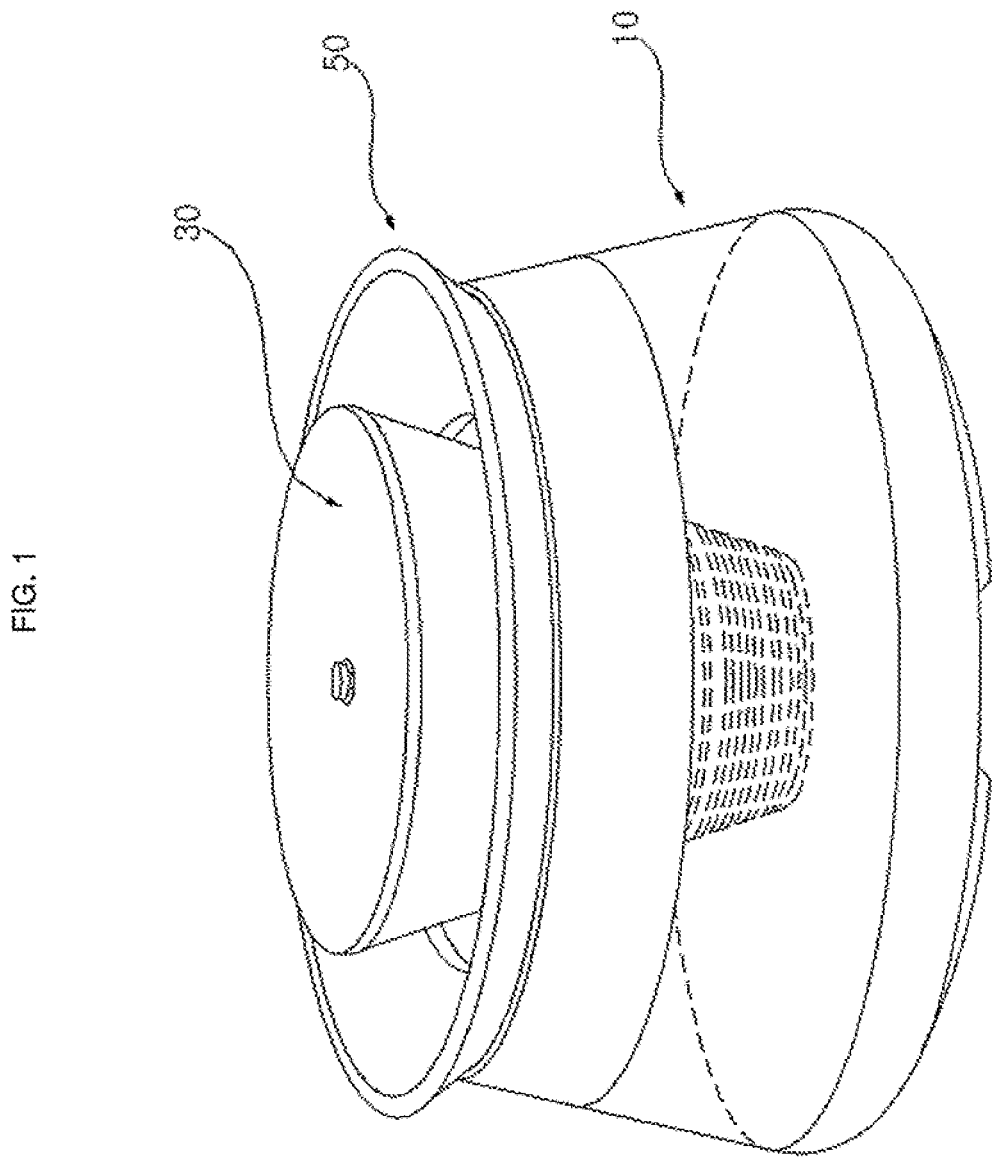
FIG. 1 is a perspective view of a pet water dispenser according to an embodiment.
Figure 2:
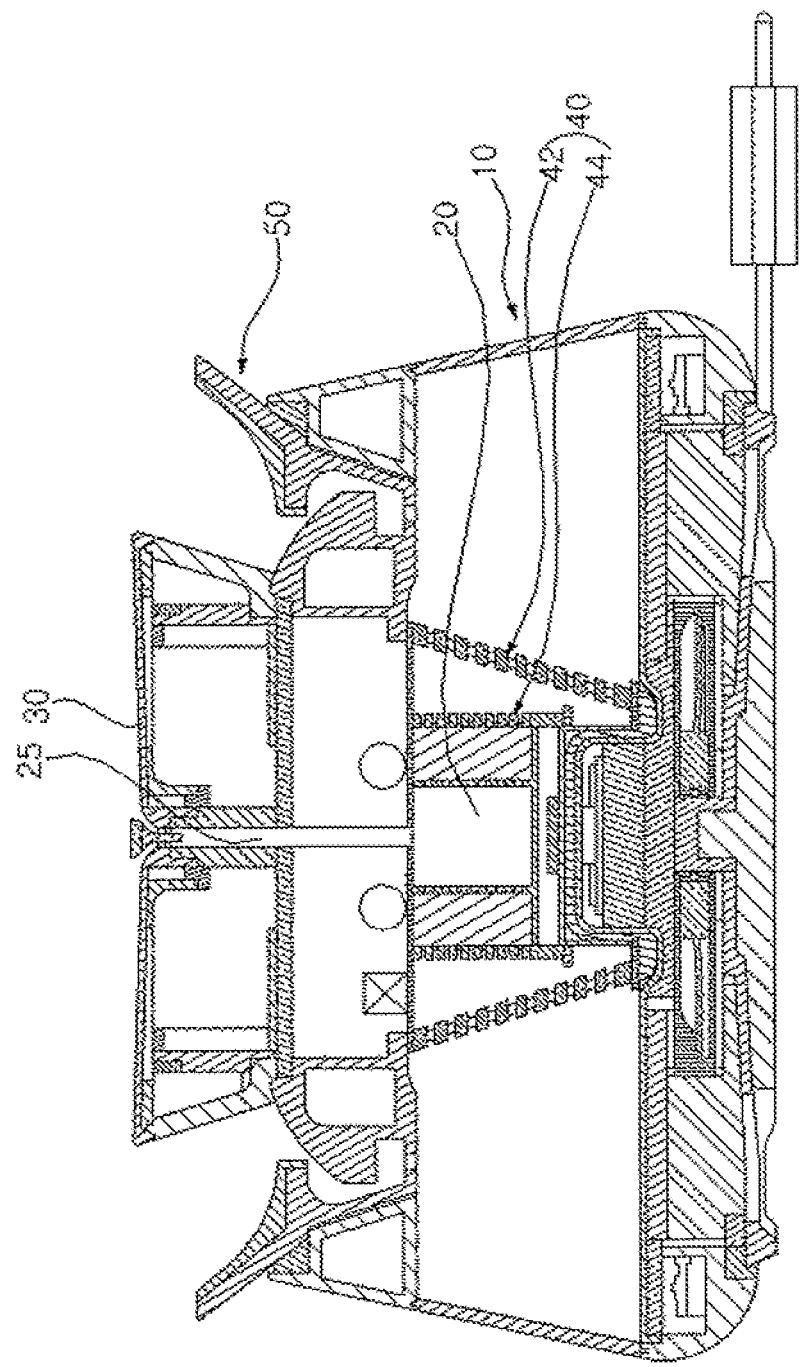
FIG. 2 is a cross-sectional view of the pet water dispenser shown in FIG. 1.

Referring to FIGS. 1-2, the pet water dispenser may include the water tank 10 in which water is stored, the pump 20 to pump water stored in the water tank 10, a water supply pipe 25 connected to the pump 20, and a water supply plate or upper plate 30 over which water supplied from the water supply pipe 25 flows. Between the water tank 10 and the water supply plate 30 may be a water guide or a water receiver 50 to catch water dropped from or cascading off the water supply plate 30 and to guide the dropped water back to the water tank 10. The water guide 50 may also be referred to as a drip tray or splash guard. Accordingly, the water in the water tank 10 may be circulated through the pump 20, the water supply plate 30, the water receiver 50, and back to the water tank 10.

The inner assembly may include the pump 20, the water supply pipe 25, the water supply plate 30, and the water guide 50. In addition, a filter assembly 40 may be provided in the inner assembly 100 to filter foreign substances contained in the water stored in the water tank 10 before flowing into the pump 20.

Figure 3:
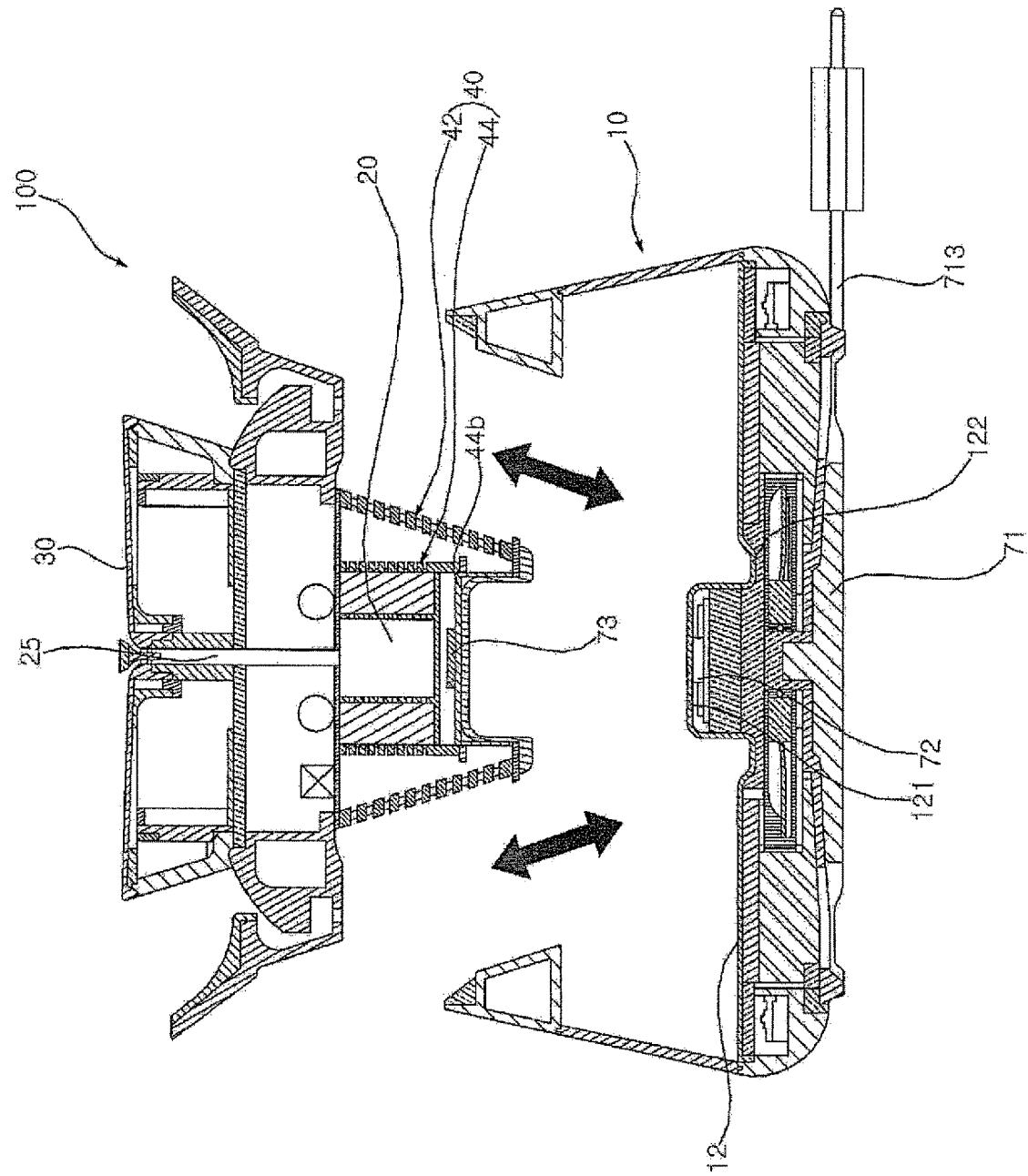
FIG. 3 is a cross-sectional view illustrating a decoupling of a water tank and an inner assembly according to an embodiment.

Referring to FIG. 3, the inner assembly 100 and the water tank 10 may constitute two primary parts of the pet water dispenser. When a user lifts the inner assembly 100, the inner assembly 100 may be separated or removed from the water tank 10. When the inner assembly 100 is inserted into the water tank 10, the inner assembly 100 and the water tank 10 may be combined and coupled.

The user may remove the inner assembly 100 from the water tank 10 to replace the water stored in the water tank 10 or clean the water tank 10. The pump 20, the water supply pipe 25, the water supply plate 30, and the filter assembly 40 may be integrally combined to constitute a single inner assembly 100. The inner assembly 100 may not couple to the water tank 10 via a complicated fixing structure, and the inner assembly 100 may be simply mounted in the water tank 10 so that the inner assembly 100 and the water tank 10 may be easily separated.

The water tank 10 may include a protrusion 121 formed on a bottom plate 12, and the inner assembly 100 may have a cylinder support 44b with a recess or cavity formed therein to engage with the protrusion 121. The inner assembly 100 may be inserted into the water tank 10 by inserting the protrusion 121 of the water tank 10 into the cavity of the support cylinder 44b.

Referring to FIG. 4A, the water tank 10 may include a wall 11 forming sides of the water tank 10. The wall 11 may include a main or middle wall 11c, an upper wall 11a provided above the main wall 11c, and a container support 11b provided below the main wall 11c. The walls 11a and 11c and the container support 11b may be integrally made of the same material, or may be made of different materials and later combined. As an example, the upper wall 11a and the container support 11b may be made of an opaque material like stainless steel or pigmented plastic. The main wall 11c may be made of a transparent material like glass or plastic. The bottom plate 12 may be made of stainless steel or plastic.

A bottom plate 12 may be provided between the main wall 11c and the bottom wall 11b. The bottom plate 12, the main wall 11c, and the upper wall 11a may therefore form an area or container of the water tank 10 where water is stored. The bottom plate 12, the container support 11b, and a base plate spaced apart from the bottom plate 12 may further define a dry area or space sealed off from water.

The main wall 11c and the upper wall 11a may form a cylindrical or truncated cone shape of the container of the water tank 10, where diameters of the main wall 11c and upper wall 11a diminish from bottom sides to top sides. A lower diameter of the upper wall 11a may be the same as an upper diameter of the main wall 11c, and a lower diameter of the main wall 11c may be the same as an upper diameter of the container support 11b. Therefore, the walls 11a, 11b, and 11c may create a seamless wall.

The bottom plate 12 may have the protrusion 121, which may be convex upward to be hollow inside. The protrusion 121 may protrude upward from a center of the bottom plate 12. However, the position of the protrusion 121 is not limited to a center position described in the above description and drawings, and may be easily modified by a person skilled in the art.

The support cylinder 44b of the inner assembly 100 to be described later may be provided on the protrusion 121 so that the protrusion 121 and the support cylinder 44b may be engaged with each other. Therefore, even if an external impact is applied to the pet water dispenser, the protrusion 121 may function as a latching jaw so that the water tank 10 and the inner assembly 100 may not be separated.

Figure 4B:
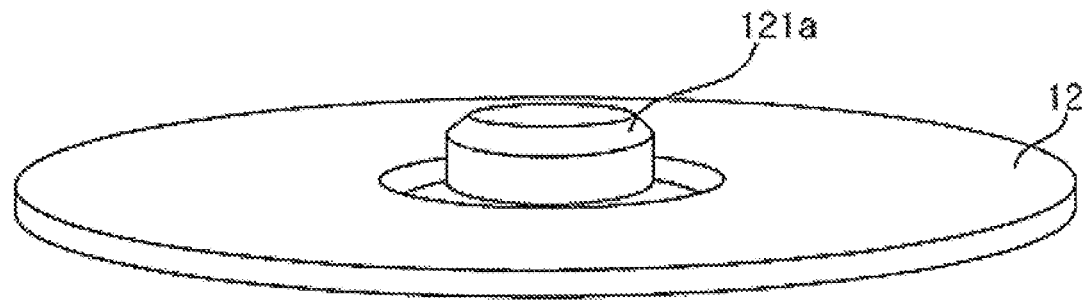
FIGS. 4B-4D are perspective views of various configurations of a bottom plate defining a bottom surface of the water tank.
Figure 4C:
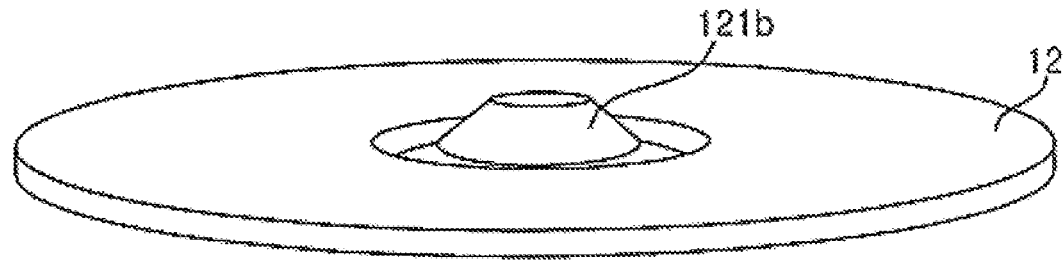
Figure 4D:
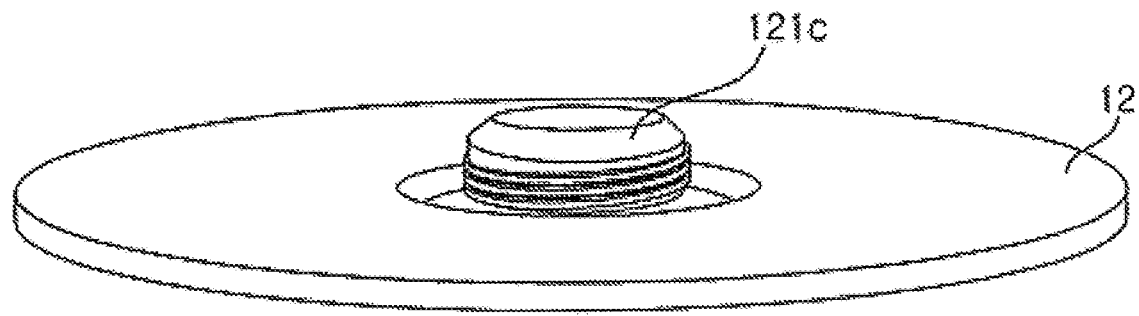

Referring to FIG. 4B, a protrusion 121a according to an embodiment may be cylindrical or have a cap shape. Referring to FIG. 4C, a protrusion 121b may have a truncated conical shape with an inclined side surface having a diameter that diminishes from a bottom side to a top side of the protrusion 121b. Referring to FIG. 4D, a protrusion 121c may have a coupling means provided at a side surface, such as threads to use in a screwing method, an interlock arm, or a hook member. The shape of the protrusion 121 is not limited to the above-described description and drawings, but may be easily modified by a person skilled in the art. A lower filter cover 43 provided on a bottom of the support cylinder 44 may be configured to have a shape that corresponds to an outer surface contour of the protrusion 121.

The bottom plate 12 may further include a groove or recess 122. The groove 122 may be annular to surround the protrusion 121, and may be adjacent to a lower end of the protrusion 121. A height of the groove may be lower than a height of the lower end of the protrusion 121 and a height of a flat portion of the bottom plate 12.

A positional relationship and shape of the groove 122 and the protrusion 121 are not limited to those described in the above description and drawings. For example, a cross-section of the groove 122 may have a curved or angled edge. In addition, the groove 122 may be formed in a polygonal shape instead of an annular shape, and may not be formed as one continuous groove 122 but instead as a plurality of grooves 122 around the protrusion 121.

A portion of a lower filter cover 43 of the inner assembly 100 may be positioned in the groove 122 to more stably maintain an engagement between the support cylinder 44b and the protrusion 121. A detailed description thereof will be described later.

Figure 5:
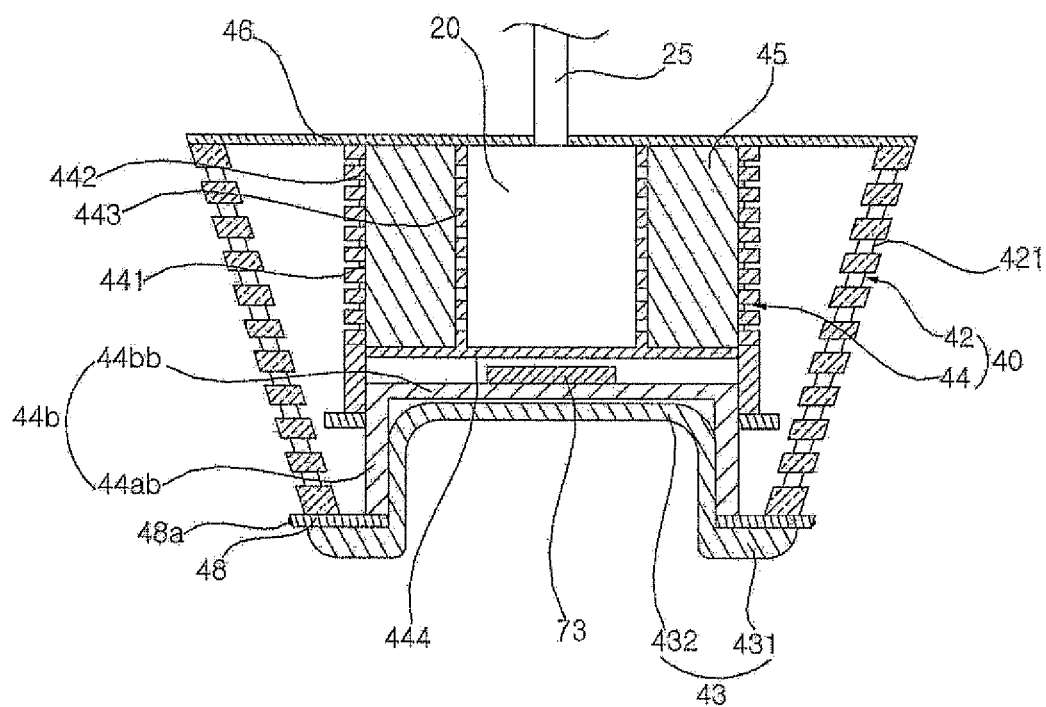
FIG. 5 is an enlarged cross-section view of a part of the inner assembly according to an embodiment.

Referring to FIG. 5, the support cylinder 44b may be provided on a lower end of the inner assembly 100 to engage with the protrusion 121. The support cylinder 44b may include a sidewall 44ab perpendicular to the bottom plate 12 and an upper plate 44bb coupled to an upper end of the sidewall 44ab. The protrusion 121 may be inserted into a cavity or concave portion formed by the upper plate 44bb and the sidewall 44ab. An inner shape of the support cylinder 44b may be formed to correspond to an outer shape of the protrusion 121 so that the support cylinder 44b may be stably retained in the protrusion 121. In this specification, "cylindrical" or "cylinder" may mean a cylindrical shape and/or a truncated cone shape, and will be considered to include a structure in which a horizontal or lateral side cross section forms a closed loop shape.

Referring to FIGS. 2, 3, 5, and 6, the filter assembly 40 may include a first or outer filter 42 and a second or inner filter 44 to receive the pump 20 and the support cylinder 44b. The second filter 44 may have a tubular outer wall 442 extending perpendicular to the bottom plate 12 and an inner wall 443 provided inside the outer wall 442. The pump 20 may be provided inside the inner wall 443.

A support plate 444 may be provided below the pump 20 and the inner wall 443 and couple to the outer wall 442 to partition and seal a space below the pump 20 accommodating a wireless power receiver to be described later. The support plate 444 may support the outer wall 442 as a horizontally extending transverse plate. The support plate 44 may divide the outer wall 442 into upper and lower ends or sections of the second filter at a position where the support plate 44 couples to an inner surface of the outer wall 442.

An inner surface of the outer wall 442 may couple to an outer surface of the sidewall 44ab so that the lower end of the second filter and the support cylinder 44b may be coupled to each other. A part of the support cylinder 44b may be inserted into the lower end of the second filter at a position that creates a space between the support plate 444 and the upper plate 44bb. Thus, the upper plate 44bb may not contact the support plate 444. The outer wall 442 and the sidewall 44ab may be coupled via fusion, welding, adhesion, a screw method, or a hook method. Such a coupling between the outer wall 442 and the sidewall 44ab may be configured to seal the space between the upper plate 44bb and the support plate 444 so that the wireless power receiver does not contact water, and may be configured to withstand deformation or damage during coupling and detaching the protrusion 121 with the support cylinder 44b.

The pump 20 may be provided inside the upper end of the second filter 44. The inner and outer walls 442 may include a plurality of through-holes. A size and shape of the through holes 441 may be configured to facilitate circulation of water so that a temperature of the water may be more easily maintained. A filter material 45 (e.g., a carbon filter) may be provided between the inner and outer walls 442 and 443.

Referring to FIG. 4A, water contained in the water tank 10 may be cooled or heated by using a thermoelectric element 81 provided under the bottom plate 12. The thermoelectric element 81 may be a Peltier device or a thermoelectric cooler (TEC). The pet water dispenser may further include a water temperature sensor 85 provided in the protrusion 121. The bottom plate 12 may be made of a material having a high thermal conductivity or metal (e.g., stainless steel). The water temperature sensor 85 may alternatively be at least partially provided in the container of the water tank 10 to directly contact the water stored in the water tank 10. If water in the water tank 10 is not maintained at a predetermined temperature and then a user later controls the water tank 10 to cool the water, the water temperature sensor 85 may sense the water in the water tank 10 to be at a temperature significantly higher than a preset or predetermined temperature.

The water may be cooled via a thermoelectric element 81 (and an optional heat sink or fan) to lower the temperature of the water, and such a cooling process may consume a relatively high amount of power. On the other hand, when water in the water tank 10 is constantly maintained at the predetermined temperature, when new water is added to the water tank 10, a cooling process via the thermoelectric element 81 may consume less power.

The water tank 10 may further include a water level sensor and maintain a predetermined water level via a configuration of the pump 20 and the positions of the through holes 441 through which water is introduced into the pump 20. Such a configuration will be described later. A controller may estimate a temperature difference and therefore power consumption of the cooling process when water is newly added to the water tank 10 based on the predetermined water level, the predetermined temperature, and the water level sensor, if the controller assumes the newly added water to be at room temperature.

Figure 6:
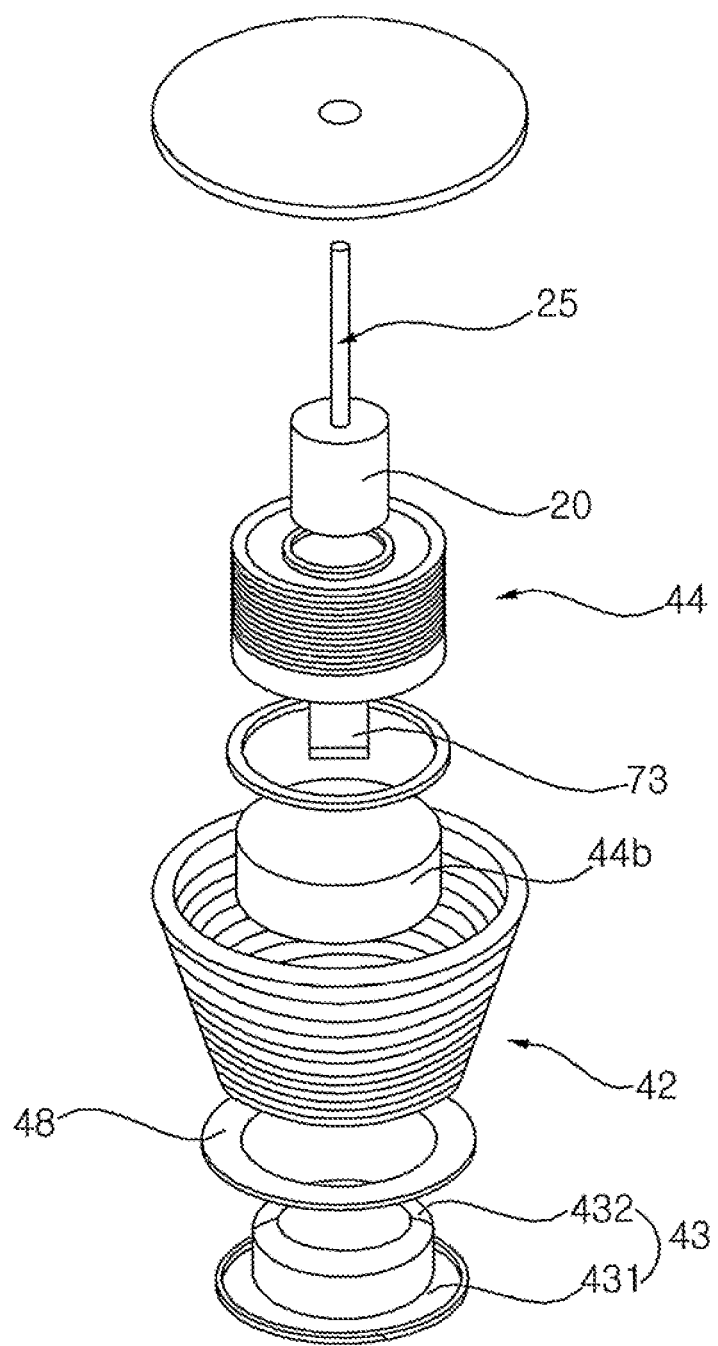
FIG. 6 is a perspective view showing a coupling structure of the inner assembly according to an embodiment.

Referring to FIGS. 5 and 6, as described above, the pump may be provided on the support plate 444 above the support cylinder 44b, and a plurality of through holes 441 may be formed in the outer wall 442 at the upper end of the second filter 44. There may not be a through hole 441 formed in the outer wall 442 at the lower end of the second filter 44 below the support plate 444 so that the space accommodating the wireless power receiver may be sealed from water. Therefore, when the water level is lower than a height of the second filter 44, the water is no longer introduced into the pump 20.

To operate the pump 20, electric power must be transmitted to the pump 20. The pet water dispenser according to an embodiment may provide electric power to the pump 20 using a wireless power transmission (WPT) method.

Referring to FIGS. 3 to 5, power may be transmitted to the pump 20 using the docking station 71, a first wireless power transfer device 72 (e.g., a wireless power transmitter and/or transceiver), and a second wireless power transfer device 73 (e.g., a wireless power receiver and/or transceiver). External power may be supplied via an electrical wire 713 drawn out from the docking station 71 and connected to an external power supply (e.g., external wall socket). For convenience of description, the first and second wireless power transfer devices 72 and 73 will be referred to as a wireless power transmitter and receiver, respectively.

The wireless power transmitter 72 may receive power from the docking station 71 and transmit the power to the wireless power receiver 73 using wireless power transmission (e.g., an electromagnetic induction method). The wireless power receiver 73 may be electrically connected to the pump 20 to supply power to the pump 20. Details of the wireless power transfer (WPT) process may be found in U.S. application Ser. No. 16/571,074 filed on Sep. 14, 2019, the entire contents of which are incorporated by reference herein.

The wireless power transmitter 72 may be provided in an inner space of the protrusion 121 below the bottom plate 12, and the wireless power receiver 73 may be provided between the upper plate 44bb and the support plate 444 of the inner assembly 100. The wireless power transmitter and receiver 72 and 73 may not come into contact with water.

Positions of the wireless power transmitter and receiver 72 and 73 may be aligned with each other to facilitate a strong electric connection or coupling. Since the water tank 10 and the inner assembly 100 may be stably coupled with each other by the protrusion 121 and the support cylinder 44b as described above, positions of the wireless power transmitter 72 and the wireless power receiver 73 may be stably maintained.

Referring to FIG. 5, the first filter 42 may surround later sides of the support cylinder 44b and the second filter 44. The first filter 42 may include a plurality of through holes 421 larger than the through holes 441 of the second filter, and may therefore filter foreign particles having a particle size larger than particles filtered through the through holes 441 formed in the second filter 44.

As an example, a pet licking the water supply plate 30 or the water guide 50 may have food in his mouth or on his snout may fall and be mixed with the water stored in the water tank 10. The first filter 42 may prevent foreign matter having a particle size larger than the through holes 421, such as the food dropped from the pet, from passing through the plurality of through holes 421.

The first filter 42 may have a tubular shape perpendicular to the bottom plate 12, or may have a truncated cone shape as exemplified in FIG. 5. The support cylinder 44b and the second filter 44 may be provided inside the first filter 42.

Upper and lower surfaces or ends of the first filter 42 may be opened. The first filter 42 may be formed of stainless steel. A specific shape and material of the first filter 42 are not limited to those described in the above description and drawings, but may be easily modified by a person skilled in the art.

The first filter 42 may surround the support cylinder 44b, and be coupled to the lower filter cover 43 to be described later. The pet water dispenser thus does not require an additional housing case. The first filter 42 may extend toward the lower end of the inner assembly such that a lower end of the first filter 42 roughly corresponds to the lower end of the inner assembly 100.

There may be no intermediate member between the inside of the water tank 10 and the first filter 42. The first filter 42 may be directly exposed to the water inside the water tank 10 without an additional housing case on the lower side of the inner assembly 100. The structure of the inner assembly 100 may be simple, durable, and manageable to provide easily cleaning and maintenance of both the water tank 10 and the inner assembly 100.

The support cylinder 44b and the first filter 42 may be damaged when the water tank 10 and the inner assembly 100 are directly attached or rigidly fixed to the bottom plate 12, impeding a filtration process. In addition, power supply and filtration performance may be impeded by a movement of the first filter 42 during the water supply process if the inner assembly 100 is rigidly fixed to the bottom plate 12. Furthermore, a lower edge of the support cylinder 44b and the lower edge of the first filter 42 may be easily deformed or broken due to an impact when the support cylinder 44b and/or lower end of the inner assembly 100 is rigidly fixed to the protrusion 121 and/or the bottom plate 12. Finally, such a rigid coupling between the support cylinder 44b and/or lower end of the inner assembly 100 is rigidly fixed to the protrusion 121 and/or the bottom plate 12 may result in a displacement of the wireless power transmitter and receiver 72 or 73 during impact, which may prevent power from being supplied to the pump 20.

The inner assembly 100 may be merely placed or seated on the protrusion 121, and the support cylinder 44b may be connected to the first filter 44. The support cylinder 44b may be provided in the lower side or end of the first filter 42, and a lower edge of the support cylinder 44b and a lower edge of the first filter 42 may be coupled to each other via an annular engaging portion or engagement plate 48 extending between the lower edge or end of the first filter 42 and the lower edge or end of the side wall 44ab. The engagement plate 48 may press the first filter 42 and the support cylinder 44b to be connected and coupled. The engagement plate 48 may also be referred to as an engagement disc.

The annular engagement plate 48 may have a predetermined width. A bottom surface of the lower end of the first filter 42 and a bottom surface of the lower end of the side wall 44ab may be provided on an upper surface of the engagement plate 48. The engagement plate 48 may firmly couple the first filter 42 to the support cylinder 44b via a known coupling method (e.g., friction fit, adhesion, welding, or fusion) to prevent damage and breakage.

The support cylinder 44b, the first filter 42, and the annular coupling portion 48 may be combined as one structure so that the coupling structure may be stably maintained even if there is some impact or vibration. The annular engagement plate 48 may extend past an outer edge of the first filter 42 and/or the lower filter cover 53 to function as an engaging jaw to keep the support cylinder 44b and the protrusion 121 stably coupled.

However, a method of connecting the support cylinder 44b and the first filter 42 is not limited to the engagement plate 48 and the contents described in the above description or the drawings. For example, a flange extending in the horizontal direction may be formed at a lower edge of the support cylinder 44b or the first filter 42 such that the flange is integrally formed with the support cylinder 44b or the first filter 42.

The engagement plate 48 may include an ultraviolet (UV) filter or light 48a positioned at a lateral edge of the engagement plate 48 to emit UV radiation in a horizontal direction. The UV filter 48a may include a UV LED (Ultraviolet Light-Emitting Diode), and may emit light into the surrounding water sterilize the water and eliminate bacteria and dissolve other foreign substances.

The shape of the UV filter 48a is not limited to the contents described in the above description or drawings. For example, the UV filter 48a may be annularly formed integrally with the engagement plate 48. There may be an optional UV filter or light provided on a bottom of the second filter 44 and also at an upper end or outlet of the water supply pipe 25.

Referring to FIGS. 5 and 6, the lower filter cover 43 may be provided between the support cylinder 44b and the protrusion 121. The lower filter cover 43 may be configured to fit within the support cylinder 44b, and may have an insertion portion or frame 432 inserted into the support cylinder 44b and corresponding to a combined shape of the upper plate 44bb and a lower edge of the side wall 44ba, and a flange 431 provided on the bottom surface to extend away from the a bottom of the insertion portion 432 under the engagement plate 48.

The insertion portion 432 may be configured to be inserted into the support cylinder 44b and configured to be inserted onto the protrusion 121. The insertion portion 432 may be stably engaged with an inner surface of the sidewall 44ba and the lower surface of the upper plate 44bb.

The insertion portion 432 may be in direct contact with the protrusion 121 and may absorb an impact generated when the protrusion 121 is inserted below the lower filter cover 43 to reduce an impact transmitted to the support cylinder 44b and the first and second filters 42 and 44.

The lower filter cover 43 may further absorb peripheral vibrations or shocks applied to the inner assembly 100. Thus, an alignment of the wireless power transmitter 72 and the wireless power receiver 73 may be further maintained.

The flange 431 may extend in the horizontal direction from the lower end or edge of the insertion portion 432 and extend below bottom surfaces of the side wall 44ba and the first filter 42. The engagement plate 48 may be provided between the flange 431 and bottom surfaces of the side wall 44ba and the first filter 42.

The flange 431 may be provided on a bottom surface of the engagement plate 48. However, a coupling of the flange 431, the side wall 44ba, and the first filter 42 is not limited to the contents disclosed in the above description and drawings. For example, the engagement plate 48 may be omitted, and bottom surfaces of the side wall 44ba and the first filter 42 may be directly connected to the flange 431.

The flange 431 may be provided in the groove 122 of the water tank 10 when the inner assembly 100 is inserted into the water tank 10. The flange 431 provided in the groove 122 may stably maintain a position of the inner assembly 100 and prevent movement in the horizontal direction, improving stability. A shape of the flange 431 may be configured to correspond to shape of the groove 122.

A bottom surface of the flange 431 may be convex downward or curved to conform to the convexity or curvature of the groove 122. However, the shape of the flange 431 is not limited to the contents described in the above description or drawings, and it is to be understood that the flange 431 may be easily changed by a person skilled in the art to match the shape of the groove 122.

When the lower filter cover 43 of the inner assembly 100 and the protrusion 121 are engaged with each other, a view of the protrusion 121 may not be obstructed when a lower portion of the first filter 42 includes the plurality of through holes 421 and the flange 431 has a small width. When the flange 431 is too large in size, a view of a bottom of the support cylinder 44b may be obscured by the flange 431. In addition, a larger flange 431 may be more likely to break. A width of the flange 431 may be configured to be relatively small or thin.

The lower filter cover 43 may include an elastic body or member. In the present specification, the term elastic body is not limited to describing a material having elastic properties higher than a reference elasticity, and it should be understood as a concept opposite to a rigid body without restoration of deformation. For example, the elastic body may include a polymer (e.g., plastic or rubber) or other elastic materials. However, the constituent material of the lower filter cover 43 is not limited to plastic or rubber, but may be included in a range that may be readily applied by a person skilled in the art. The lower filter cover 43 may additionally or alternatively include a metal or another material having rigidity.

Upper ends of the first and second filters 42 and 44 may be connected by an upper filter cover 46, which may be a plate extending in a horizontal direction. The upper filter cover 46 may be coupled to the water guide 50 to form a single inner assembly 100 together with the water supply plate 30. The upper filter cover 46, the first filter 42. and the second filter 44 may be formed integrally or manufactured separately and later combined (e.g., welded, bonded, fused, or adhered). The second filter 44 and the first filter 42 may be separated from each other by the upper filter cover 46 at upper ends and the lower filter cover 43 at lower ends.

The water supply plate 30 may be configured to be removable from the inner assembly 100. The water supply plate 30 may be lifted up and removed to be cleaned, repaired, or swapped with another water supply plate 30 having a different height, shape, angle of inclination, material, etc.

This application is related to U.S. application Ser. No. 16/571,245 filed on Sep. 16, 2019, U.S. application Ser. No. 16/571,093 filed on Sep. 14, 2019, U.S. application Ser. No. 16/571,090 filed on Sep. 14, 2019, U.S. application Ser. No. 16/571,089 filed on Sep. 14, 2019, U.S. application Ser. No. 16/571,076 filed on Sep. 14, 2019, U.S. application Ser. No. 16/571,074 filed on Sep. 14, 2019, U.S. application Ser. No. 16/571,075 filed on Sep. 14, 2019, U.S. application Ser. No. 16/570,310 filed on Sep. 13, 2019, U.S. application Ser. No. 16/570,279 filed on Sep. 13, 2019, U.S. application Ser. No. 16/569,827 filed on Sep. 13, 2019, U.S. application Ser. No. 16/659,841, filed on Sep. 13, 2019, and U.S. application Ser. No. 16/569,908 filed on Sep. 13, 2019, the entire contents of which are incorporated by reference herein.

Further, the following Korean Applications are also incorporated herein by reference: 10-2018-0122992 filed on Oct. 16, 2018; 10-2018-0123552 and 10-2018-0123553 filed on Oct. 17, 2018; 10-2018-0131037 filed on Oct. 30, 2018; 10-2018-0131405 filed on Oct. 31, 2018; 10-2019-0059513 and 10-2019-0059514 filed on May 21, 2019; 10-2018-0133062 filed on Nov. 1, 2018; 10-2019-0059787 filed on May 22, 2019; 10-2019-0060918, 10-2019-0060919, and 10-2019-0060920 filed on May 24, 2019; and 10-2019-0080603 and 10-2019-0080604 filed on Jul. 4, 2019.

Embodiments disclosed herein may be implemented as a liquid dispenser that supplies drinking water to an animal such as a pet. However, embodiments disclosed herein are not limited to pets. For example, the liquid dispenser may be used in a zoo to supply drinking water to animals kept in a zoo, research areas, wildlife preservation areas, etc.

Embodiments disclosed herein may be implemented as a pet water dispenser capable of minimizing damage of a first filter and a concave portion or support cylinder due to an impact generated during a process of coupling a protrusion and a recess or cavity, and stably maintaining a coupling structure. The pet water dispenser may minimize a change in water temperature and maintain a set water temperature easily. The pet water dispenser may be simple in structure and excellent in durability, and may be easily managed or repaired without a complicated assembly and disassembly. The concave portion and the protrusion may be easily combined. Embodiments disclosed herein may solve all the problems that may be caused or predicted from the related art, in addition to the technical problems described above.

A pet water dispenser may include a concave portion or support cylinder of an inner assembly, and a projection or protrusion of a bottom plate of a water tank, and a pump. The inner assembly may include the pump, and may connect and support a tubular first filter surrounding the concave portion. The concave portion or support cylinder may include a cylindrical recessed sidewall or sidewall perpendicular to the bottom plate and an upper plate that shields the upper surface of the sidewall. The protrusion may be inserted into the bottom surface of the sidewall.

The first filter may be cylindrical in shape and perpendicular to the bottom plate, and the concave portion, which may form a recess, is provided on the inner lower side. A lower edge of the first filter and a lower edge of the sidewall of the recess may be connected to each other. A ring-shaped coupling portion or engagement plate or disc may contact a bottom surface of the lower edge of the first filter and a bottom surface of the lower edge of the concave portion. The coupling portion may be coupled to the first filter and the concave portion.

A lower filter cover may be provided between the concave portion and the protrusion. The lower filter cover may include an insertion portion inserted into the recess and a flange extending horizontally from below the insertion portion and provided on a lower edge of the side wall of the recess and a lower edge of the lower edge of the first filter. The coupling portion may be provided on the flange.

The bottom plate may further include a downwardly convex groove or recess, and the groove and a lower end of the protrusion may be in contact with each other. The flange may be provided in the groove. A lower edge of the first filter may be provided on an edge of the flange.

The inner assembly may further comprise a second filter to receive the pump. The second filter may have a tubular outer wall perpendicular to the bottom plate and an upper portion inside the second filter. A support plate may partition an inner lower portion of the second filter, and the pump may be provided at an upper end inside the second filter.

A part of the concave portion may be located in the lower end of the second filter. A part of the outer wall may be in contact with a part of the side wall, and the support plate may be separated from the upper plate. The second filter may be located inside the first filter, A plate-shaped upper filter cover may connect the upper edge of the first filter and the upper edge of the second filter.

The coupling portion may include a UV sterilizing filter or light, and the UV sterilizing filter may be provided at a side outer rim of the coupling portion in a point shape so as to be irradiated with UV in a horizontal direction. The lower filter cover may include an elastic body.

The pet water dispenser may include support cylinder having a recess or cavity in which the inner assembly engages with a protrusion and a second filter or filter located on the recess. The second filter may include a tubular outer wall perpendicular to the bottom plate and a support plate dividing the second filter into an upper portion or section inside the second filter and a lower portion or section inside the second filter across the inside of the outer wall. The pump may be positioned above the support plate, and a through hole may be formed in the outer wall portion corresponding to the upper end of the second filter to allow water to flow into the pump.

A part of the upper side of the support cylinder may be inserted into the lower end of the second filter. The outer wall portion and the support plate corresponding to the lower end of the second filter may form the through hole. A thermoelectric element to regulate a water temperature of the water in the water tank may be provided below the bottom plate.

Embodiments disclosed herein may minimize a breakage of a concave portion or support cylinder and a first filter and may stably maintain a coupling structure during detachment of a water tank and an inner assembly by coupling the concave portion onto a protrusion. The concave portion may be inserted into the first filter.

Since a pump may be provided at a certain distance from the bottom plate, a minimum water level may be maintained in the water tank, and a set water temperature may be easily maintained. Since the pet water dispenser may not have an additional waterproof housing, complicated disassembly or assembly is unnecessary even during cleaning or repairing, and management or maintenance may be easy.

In addition, embodiments disclosed herein may eliminate a need for additional waterproof housing design, simplifying a structure and improving a durability. A lower edge of a first filter may be provided on an edge of a lower filter cover to easily engage a recess in a projection of a water tank bottom plate.

Embodiments disclosed herein may be implemented as a liquid dispenser comprising a tank having a bottom, the bottom including a protrusion projecting upward, and an inner assembly having a pump and a bottom provided over the protrusion of the tank, the inner assembly being removable from the tank. The inner assembly further may include a first filter and a support including an upper plate and a sidewall, the sidewall connected to a lower side of the first filter. When the inner assembly is placed into the tank, the upper plate and the sidewall of the support cylinder may cover a top surface and side supports, respectively, of the protrusion.

An engagement disc may be provided below lower ends of the first filter and the sidewall to connect the first filter to the support. The engagement disc may include an ultraviolet (UV) filter provided at a lateral outer edge of the engagement disc to irradiate UV radiation away from the engagement disc.

A lower filter cover may be provided at a lower end of the first filter. The lower filter cover may include a frame inserted into the support and inserted onto the protrusion when the inner assembly is coupled to the tank and a flange extending in a horizontal direction from a lower end of the frame and provided under lower ends of the first filter and the support. An engagement disc may be provided on the flange between the flange and the lower ends of the first filter and the support to connect the first filter and the support. A groove may be formed in the bottom of the tank and surrounding the protrusion. The flange may be provided in the groove when the inner assembly is coupled to the tank. The flange may connect the support to the first filter. The lower filter may cover may include an elastic material.

The inner assembly may further comprise a second filter. The second filter may include an outer wall perpendicular to the bottom plate and a support plate provided within the outer wall dividing the second filter in upper and lower sections. The pump may be provided inside the second filter on the support plate in the upper section.

A portion of the support may be located inside the lower section of the second filter. The outer wall may contact the sidewall of the support. The support plate may be spaced apart from the upper plate. The second filter may be located inside the first filter. An upper filter cover may connect the upper ends of the first and second filters.

Embodiments disclosed herein may be implemented as a liquid dispenser, comprising a tank including a bottom formed with a projection protruding upward and an inner assembly having a pump, the inner assembly configured to be removable from the tank and having a cylinder that mates with the projection. The inner assembly may furth include a first filter provided above the support and including a wall perpendicular to the bottom of the tank and a support plate extending across the wall to divide the first filter into upper and lower sections. The pump may be provided in the upper section, and at least one through hole may be formed in a portion of the wall defining the upper section.

The support may be partially inserted into the lower section of the inner filter. The wall of the first filter may not include a through-hole in the lower section. A thermoelectric element may be provided below the bottom of the tank to regulate a temperature of the liquid in the tank.

Embodiments disclosed herein may be implemented as a liquid dispenser comprising a tank including a protrusion formed on a bottom of the tank to protrude upward and an inner assembly provided to pump liquid in the tank and supply liquid to an outside of the tank. The inner assembly may be removable from the tank and may include a filter. When the inner assembly is coupled to the tank, the filter may surround the protrusion. A diameter of the filter may increase in an upward direction.

It will be understood that when an element or layer is referred to as being "on" another element or layer, the element or layer may be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" may encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments may be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid dispenser, comprising:
    a tank having a bottom, the bottom including a protrusion projecting upward; and
    an inner assembly having a pump and a bottom provided over the protrusion of the tank, the inner assembly being removable from the tank,
    wherein the inner assembly further includes:
        a first filter, and
        a support including an upper plate and a sidewall, the sidewall connected to a lower side of the first filter, wherein, when the inner assembly is placed into the tank, the upper plate and the sidewall of the support cover a top surface and side supports, respectively, of the protrusion, and
    wherein the liquid dispenser further comprises a lower filter cover provided at a lower end of the first filter, the lower filter cover including:
        a frame inserted into the support and inserted onto the protrusion when the inner assembly is coupled to the tank, and
        a flange extending in a horizontal direction from a lower end of the frame and provided under lower ends of the first filter and the support.

2. The liquid dispenser of claim 1, further including an engagement disc provided below lower ends of the first filter and the sidewall to connect the first filter to the support.

3. The liquid dispenser of claim 2, wherein the engagement disc includes an ultraviolet (UV) filter provided at a lateral outer edge of the engagement disc to irradiate UV radiation away from the engagement disc.

4. The liquid dispenser of claim 1, further including an engagement disc provided on the flange between the flange and the lower ends of the first filter and the support to connect the first filter and the support.

5. The liquid dispenser of claim 1, further including a groove formed in the bottom of the tank and surrounding the protrusion.

6. The liquid dispenser of claim 5, wherein the flange is provided in the groove when the inner assembly is coupled to the tank.

7. The liquid dispenser of claim 1, wherein the flange connects the support to the first filter.

8. The liquid dispenser of claim 1, wherein the lower filter cover includes an elastic material.

9. The liquid dispenser of claim 1, wherein the inner assembly further comprises a second filter that includes:
    an outer wall perpendicular to the bottom of the tank, and
    a support plate provided within the outer wall dividing the second filter in upper and lower sections, wherein the pump is provided inside the second filter on the support plate in the upper section.

10. The liquid dispenser of claim 9, wherein a portion of the support is located inside the lower section of the second filter.

11. The liquid dispenser of claim 10, wherein the outer wall contacts the sidewall of the support, and wherein the support plate is spaced apart from the upper plate.

12. The liquid dispenser of claim 9, wherein the second filter is located inside the first filter.

13. The liquid dispenser of claim 12, further including an upper filter cover connecting the upper ends of the first and second filters.

14. A liquid dispenser, comprising:
    a tank including a bottom formed with a projection protruding upward; and
    an inner assembly having a pump, the inner assembly being configured to be removable from the tank and having a cylinder that mates with the projection, the inner assembly further including a first filter provided above the cylinder and including a wall perpendicular to the bottom of the tank and a support plate extending across the wall to divide the first filter into upper and lower sections, wherein the pump is provided in the upper section, and at least one through hole is formed in a portion of the wall defining the upper section.

15. The liquid dispenser of claim 14, wherein the cylinder is partially inserted into the lower section of the first filter.

16. The liquid dispenser of claim 15, wherein the wall of the first filter does not include a through-hole in the lower section.

17. The liquid dispenser of claim 14, further including a thermoelectric element provided below the bottom of the tank to regulate a temperature of the liquid in the tank.

18. A liquid dispenser, comprising:
    a tank having a bottom, the bottom including a protrusion projecting upward; and
    an inner assembly having a pump and a bottom provided over the protrusion of the tank, the inner assembly being removable from the tank,
    wherein the inner assembly further includes:
        a first filter, and
        a support including an upper plate and a sidewall, the sidewall connected to a lower side of the first filter, wherein, when the inner assembly is placed into the tank, the upper plate and the sidewall of the support cover a top surface and side supports, respectively, of the protrusion, and
    wherein the inner assembly further includes a second filter that includes:
        an outer wall perpendicular to the bottom of the tank, and
        a support plate provided within the outer wall dividing the second filter in upper and lower sections, wherein the pump is provided inside the second filter on the support plate in the upper section.

19. The liquid dispenser of claim 18, wherein a portion of the support is located inside the lower section of the second filter.

20. The liquid dispenser of claim 19, wherein the outer wall contacts the sidewall of the support, and wherein the support plate is spaced apart from the upper plate.

* * * * *